(12) United States Patent
Kudelski et al.

(10) Patent No.: US 8,719,869 B2
(45) Date of Patent: May 6, 2014

(54) METHOD FOR SHARING DATA AND SYNCHRONIZING BROADCAST DATA WITH ADDITIONAL INFORMATION

(75) Inventors: André Kudelski, Cheseaux-sur-Lausanne (CH); Christophe Nicolas, Cheseaux-sur-Lausanne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 323 days.

(21) Appl. No.: 13/137,274

(22) Filed: Aug. 3, 2011

(65) Prior Publication Data

US 2012/0036538 A1 Feb. 9, 2012

Related U.S. Application Data

(60) Provisional application No. 61/370,488, filed on Aug. 4, 2010.

(51) Int. Cl.
*H04N 5/445* (2011.01)

(52) U.S. Cl.
USPC ............................... 725/51; 725/48; 725/59

(58) Field of Classification Search
USPC .............................................. 725/51, 48, 59
See application file for complete search history.

(56) References Cited

U.S. PATENT DOCUMENTS

| | | | |
|---|---|---|---|
| 6,611,297 B1* | 8/2003 | Akashi et al. | 348/739 |
| 8,108,895 B2* | 1/2012 | Anderson et al. | 725/36 |
| 8,341,671 B2* | 12/2012 | Lee et al. | 725/40 |
| 8,407,741 B2* | 3/2013 | Lee et al. | 725/51 |
| 2002/0138852 A1* | 9/2002 | Reynolds et al. | 725/136 |
| 2004/0267738 A1* | 12/2004 | Shin | 707/3 |
| 2008/0092168 A1* | 4/2008 | Logan et al. | 725/44 |
| 2010/0198876 A1* | 8/2010 | Estok | 707/793 |
| 2010/0228592 A1* | 9/2010 | Anderson et al. | 705/10 |
| 2011/0061086 A1* | 3/2011 | Huang | 725/110 |
| 2011/0209181 A1* | 8/2011 | Gupta et al. | 725/62 |
| 2011/0320575 A1* | 12/2011 | Pope et al. | 709/220 |

FOREIGN PATENT DOCUMENTS

| | | |
|---|---|---|
| WO | WO 00/43899 | 7/2000 |
| WO | WO 2008/062979 | 5/2008 |
| WO | WO 2008/084947 | 7/2008 |

OTHER PUBLICATIONS

International Search Report dated Oct. 19, 2011.

\* cited by examiner

*Primary Examiner* — Pankaj Kumar
*Assistant Examiner* — Sahar Baig
(74) *Attorney, Agent, or Firm* — Harness, Dickey & Pierce, P.L.C.

(57) ABSTRACT

A method for sharing data and synchronizing broadcast data with additional information, the broadcast data and the additional information being provided by at least two distinct sources to a multimedia device. The method comprises steps of:

receiving by a data extractor associated to the multimedia device broadcast data from a first source and extracting first metadata from the broadcast data, accessing by the multimedia device to additional information provided by a second source by using the first metadata and obtaining from the additional information second metadata and additional content data related to a content of the broadcast data, merging and synchronizing, by the multimedia device, the second metadata and the additional content data with the content of the broadcast data, and obtaining modified broadcast data.

16 Claims, 2 Drawing Sheets

METHOD FOR SHARING DATA AND SYNCHRONIZING BROADCAST DATA WITH ADDITIONAL INFORMATION

CROSS REFERENCE TO RELATED APPLICATIONS

This application claims priority under 35 U.S.C. Section. 119 to U.S. Provisional Application No. 61/370,488, entitled "Method for sharing data and synchronizing a control device with broadcasting signal(s)" filed Aug. 4, 2010, the content of which is hereby incorporated by reference herein.

FIELD OF THE INVENTION

The present invention concerns the field of providing enhanced information data to a user in relation with currently viewed contents.

TECHNICAL BACKGROUND

With the increasing number of audio/video data sources broadcast to homes, there is a need to synchronize different devices that may be potentially used (directly or indirectly) to deliver content to a user. Each device may have an own source of content, as well as metadata describing the content.

Traditionally the way to aggregate the metadata and content is to interconnect them through specific local protocols (API). However in an increasingly complex environment such a device-to-device synchronization it may become difficult and/or unreliable, so as to require a complicated setup which needs some specific technical skills.

The various devices may also require the usage of several remote controls that makes the user experience very complex and hard to understand.

In the classical digital TV environment, the information relative to a broadcast signal is transmitted using the extra data capacity in the broadcast signal. This technique is frequently using digital TV broadcasting standards.

In a connected digital TV environment, part or all information related to a broadcast signal may be transmitted using non broadcast transmission techniques such as Internet.

In a hybrid solution, whereas the classical digital television environment is complemented by a connected digital television set, in two distinct boxes or within the same solution, there is a further need to organize data from both channels i.e. broadcast and Internet channel in order for the end-user to have a comprehensive presentation of the information, such as the various channel and events available for purchasing. The hybrid solution can also be used to complement missing information from broadcast channel by extracting data or contextual information and then synchronizing them with information coming from the Internet channel or vice versa.

This synchronization can be done manually, for example, with the interaction of the end user watching content from the classical television set, and doing a search on the connected interface (internet for example) in order to complement the available information.

SUMMARY OF THE INVENTION

An aim of the present invention is to solve the above mentioned problems and to fulfill present needs by providing automatic means for aggregating the various content and channels in a seamless user interface and complementing automatically each channel or event with contextual information coming from other channels.

The aim is achieved by a method for sharing data and synchronizing broadcast data with additional information, the broadcast data and the additional information being provided by at least two distinct sources to a multimedia device, the method comprises steps of:
receiving by a data extractor associated to the multimedia device broadcast data from a first source and extracting first metadata from the broadcast data,
accessing by the multimedia device to additional information provided by a second source by using the first metadata and obtaining from the additional information second metadata and additional content data related to a content of the broadcast data,
merging and synchronizing, by the multimedia device, the second metadata and the additional content data with the content of the broadcast data, and
obtaining modified broadcast data.

The multimedia device receives first metadata from the broadcast data provided by the data extractor and combines or merges these metadata with additional content and metadata coming from the second source such as Internet or more generally a cloud.

The data extractor may be separated or included either in the multimedia device or in the receiver decoder.

The extracted metadata may be a service information table DVB-SI or a proprietary data stream. Information such as content title and description, channel names, but also close caption (subtitle) data or Teletext data can be extracted. The extracted data may then be used to search in Internet or the cloud for second metadata and additional content data related to content of the broadcast data. For example data available in a semantic database, operator (or broadcaster) database or in any available information source may compose the search results which are then used to modify the broadcast data.

The data provided by the cloud can also be used to look for specific content in the broadcast stream, by parsing the service information table DVB-SI, closed caption, Teletext or any type of proprietary data. In other words, the broadcast data is filtered in a dynamic way according to criteria defined by the metadata or search results provided by the cloud.

According to a preferred embodiment, the multimedia device merges and synchronizes in real time or in a differed process the data provided by each source before forwarding the broadcast data thus modified to the television set.

According to a practical example, metadata relative to a broadcast or a locally stored content are automatically extracted from Internet and used to synchronize the content. The extraction is performed by using the different tables included in the broadcast programming identification system, containing program name and program description or by using the Electronic Programming Guide EPG with the program start/end time information.

A further object of the invention comprises a multimedia device configured for sharing data and synchronizing broadcast data with additional information, the broadcast data and the additional information being provided to the multimedia device by at least two distinct sources, said multimedia device is characterized in that: it comprises:
a data extractor configured for receiving broadcast data from a first source and extracting first metadata from the broadcast data,
means for accessing to additional information provided by a second source by using the first metadata to obtain from the additional information second metadata and additional content data related to a content of the broadcast data, means for merging and synchronizing the second metadata and the additional content data with the content of the broadcast data to obtain modified broadcast data.

BRIEF DESCRIPTION OF THE DRAWINGS

The invention will be better understood with the following detailed description, which refers to the attached figures given as non-limitative examples.

DETAILED DESCRIPTION OF THE INVENTION

In a Digital TV environment, in order to synchronize information related to the availability and description of content, the integrated receiver decoder IRD and the multimedia device MM located at users home are preferably synchronized in parallel with the cloud CL comprising a single or a plurality of data sources, rather than just by being interconnected locally through a synchronization protocol (Published API) that can be accessed through a local network.

The cloud CL should be understood as a plurality of Internet resources or services. Cloud computing is a convenient on-demand model for establishing an access via a network to shared configurable storage of information resources which are quickly available by minimizing managing efforts and contacts with the service provider.

The multimedia device comprises either, an integrated receiver decoder IRD, a television set, a display or a consumption device. The television set and the receiver decoder IRD may be included in a same housing. The consumption device may consist of a consumer electronic device being able to receive data from at least two different sources for combining/synchronizing them and having connection interfaces with an integrated receiver decoder IRD, a television set TV or a display only. A desktop or portable personal computer may also be considered as consumption device having the necessary hardware and software means for processing the received data.

Figure 1:
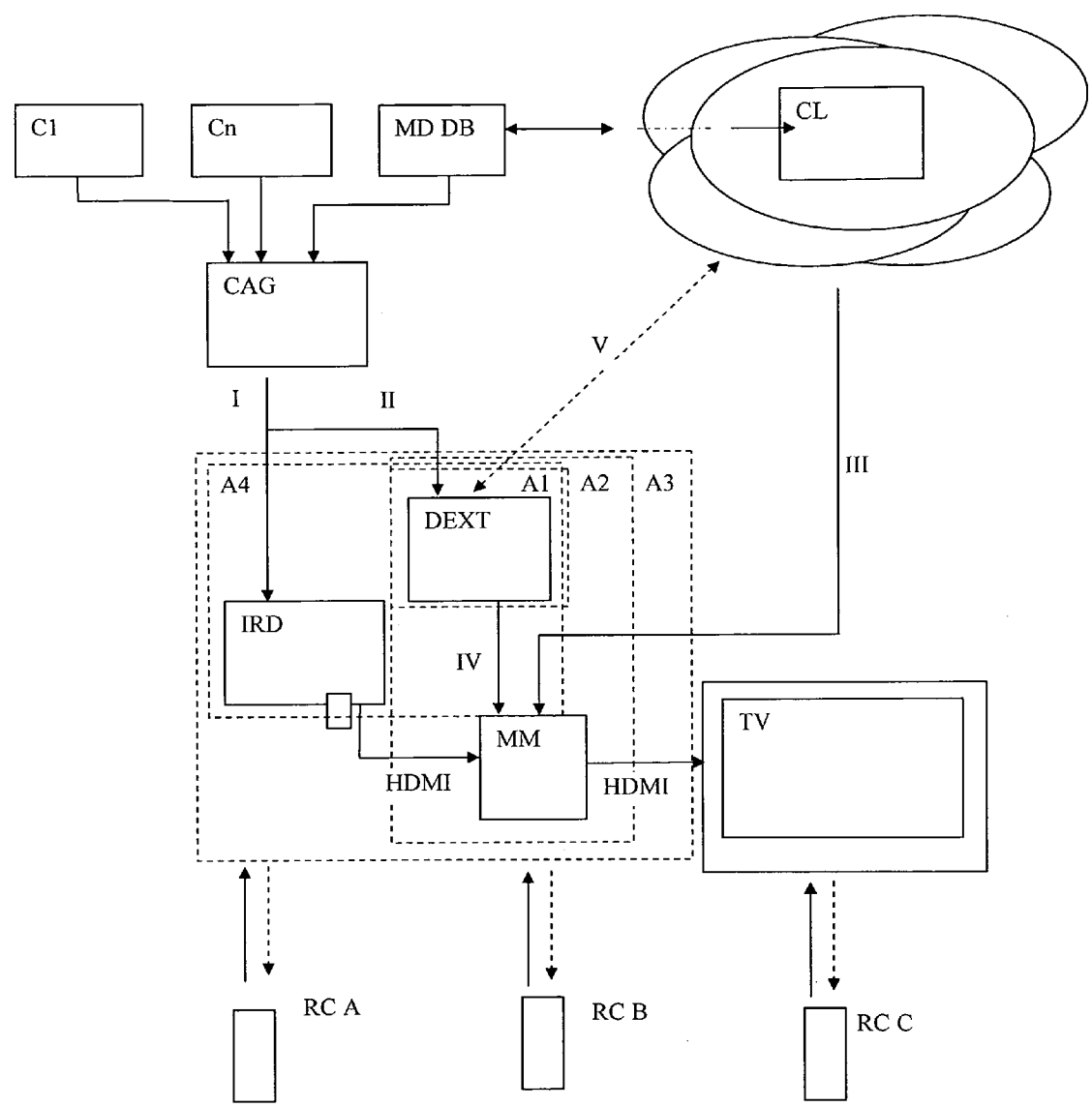
FIG. 1 shows a block schematic representing the different devices and data sources involved in the method for sharing data and synchronizing broadcast data with additional information.
Figure 2:
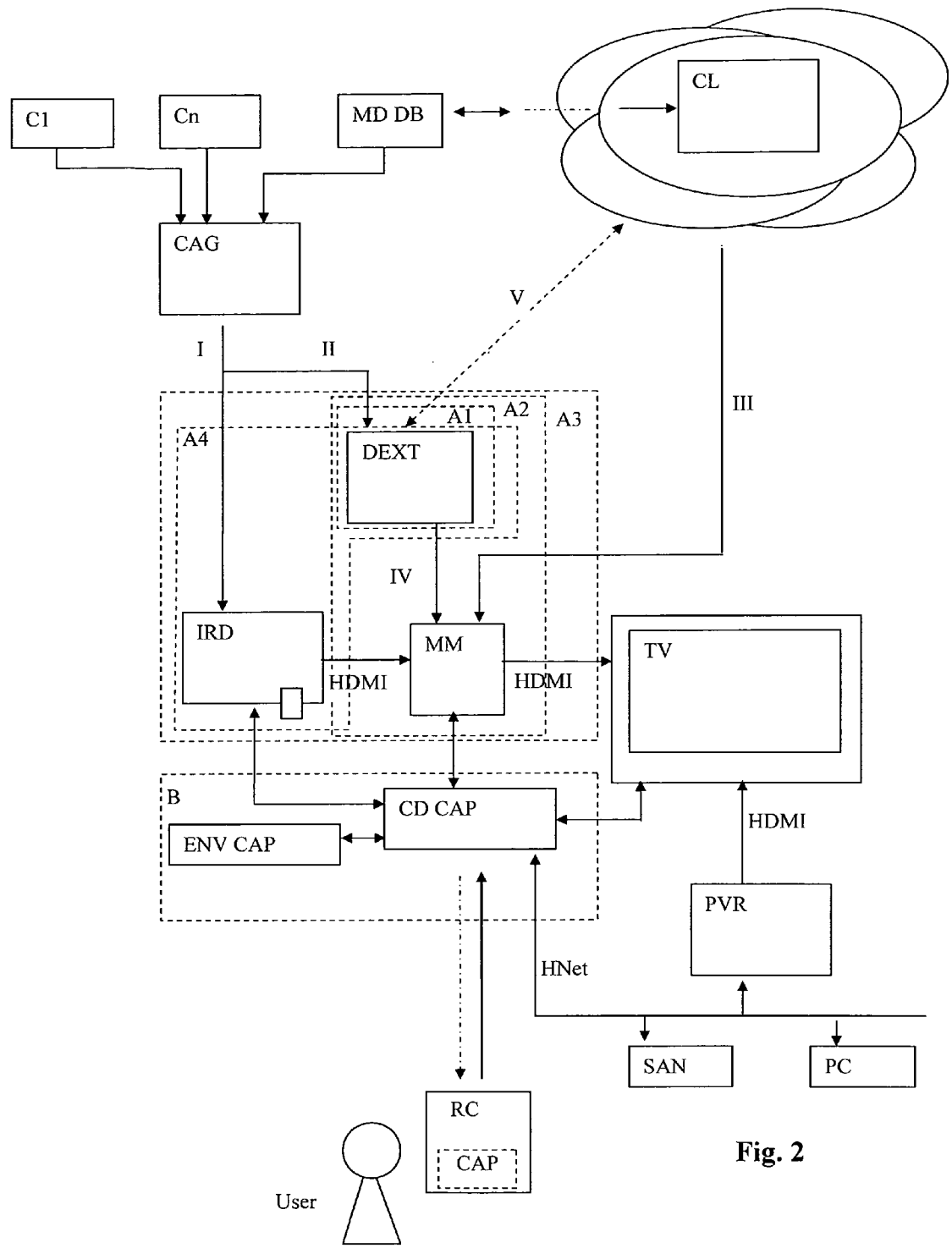
FIG. 2 shows the block schematic of FIG. 1 including optional devices adding supplementary data to the modified broadcast data related to environmental parameters and information from devices connected to a home network.

As shown by FIGS. 1 and 2, several configurations A1, A2, A3 and A4 may be envisaged for implementing the multimedia device MM and the data extractor DEXT.

In configuration A1, the data extractor DEXT is separated from the multimedia device MM in form of a consumer electronic device which is connected between the integrated receiver decoder IRD and the television set TV.

In configuration A2, the data extractor DEXT is incorporated in the multimedia device MM or vice-versa.

In configuration A3, the data extractor DEXT and the multimedia device MM are incorporated in the integrated receiver decoder IRD.

In configuration A4, only the data extractor DEXT is incorporated in the integrated receiver decoder IRD, while the multimedia device MM is separately connected between the integrated receiver decoder IRD and the television set TV.

The data transmission between the integrated receiver decoder IRD and the multimedia device MM and between the multimedia device MM and the television set complies preferably to the HDMI (High Definition Multimedia Interface) standard. However other transmission standards and protocols are also possible.

The metadata used for retrieving additional information from the cloud CL and for synchronizing additional content and metadata with content and metadata of the original broadcast data may be partially or fully extracted by the data extractor DEXT from various sources, namely:

The signal or data transmitted by an operator and/or a broadcaster, FIG. 1 (II). The content may be provided by a content aggregator CAG at a managing center of the operator or broadcaster. The content aggregator CAG groups or multiplexes content from a plurality of sources C1, . . . Cn together with meta-data stored in a database MD DB supplied by the cloud CL.

A central database or distributed databases at a managing center of the operator and/or the broadcaster A multimedia processor or an emulation of it belonging to an operator or broadcaster connected to a central server and/or directly (FIG. 1 III) or indirectly (FIG. 1 V) to the cloud CL and/or to the multimedia device MM.

An additional device B of an operator or broadcaster or an emulation of it that is connected to environmental captors such as temperature, light, noise, . . . , global positioning system (GPS) as well as optionally to a local Home Network (FIG. 2. B)

An advanced remote control RC with embedded user captor CAP such as user temperature, humidity, light, etc.

The information or data that are synchronized may either be common to all viewers connected to the broadcasted signal(s) and/or specific to a given user and/or a multimedia device as for example a local content which may be synchronized with metadata provided by the cloud.

According to an application example subtitles may be added to the broadcast data stream which does not include the subtitles in a desired language. The cloud may provide on-line translation of original subtitles available in the stream which original subtitles act as metadata extracted from the broadcast data and submitted to the cloud by the multimedia device MM. The cloud provides then in real time the suitable translation which is synchronized with the broadcast data in a similar way than the original subtitles. The multimedia device merges the translated subtitles along with the broadcast content data before forwarding the content with the new subtitles to the television set. The translation language may be selected on the basis of user preferences set up in the integrated receiver decoder IRD. For this purpose the data extractor completes the original subtitles with language information retrieved from the integrated receiver decoder IRD, FIG. 1 (I, II). The multimedia device MM may also contain suitable language information which is added to the metadata sent to the cloud.

According to a further application example, an overlay is added to the broadcast content with the data extracted by the data extractor from the cloud. These data can add information about the currently broadcast content, which can not only be synchronized with the content itself but also with appropriate corresponding parts of the content. For example in a sequence on which a castle is shown along with some actions performed by actors, the data extractor receives additional data with an index indicating when the castle is shown during the broadcast of the content. In return the data extractor can send to the multimedia device a command to display overlay information (e.g. "Interested by the Versailles castle?") on the display of the television set allowing a user to bookmark the castle for later browsing. Such displayed information will stay several seconds and vanish.

The bookmarks stored in the data extractor or in the multimedia device may be accessible upon a user command on a remote control and a selection of a specific bookmark will trig the download of additional information from the cloud.

Specific data related or not directly related to the content such as information from news feeds, statistics, stock exchanges rates, etc. can also be synchronized.

Keywords may also be generated on the basis of the broadcast content and metadata for performing a search of additional information on the cloud. The search results in form of additional information data or additional content are then merged to the broadcast content by the multimedia device MM which provides enriched content to the television set.

The data provided by the cloud CL to the multimedia device MM can also be used to look for specific content in the broadcast data stream, by parsing the first metadata such as service information table DVB-SI, closed caption, Teletext or any type of proprietary data included in the broadcast data stream. The broadcast data is thus automatically filtered in a dynamic way according to criteria defined by the second metadata or search result content provided by the cloud.

According to a further example, the broadcast data includes degraded or low resolution image content which may be modified to obtain standard or high resolution content thanks to additional content and information collected from the cloud allowing the multimedia device to enhance image quality. A conditional access control system may authorize access to the additional content and additional information also called control objects only if the user has purchased the necessary rights at the operator or broadcaster. Otherwise, a message inciting the user to purchase the necessary rights may appear overlaid on the display.

According to a further example the input audio video data may be watermarked periodically or only at specific sequences with patterns provided by a server on Internet. The watermark is then used as identification, copy protection, or personalization of the broadcast data.

The first metadata extracted from the broadcast data may be completed by extended metadata comprising at least one position indication related to a given content of the broadcast data. The extended metadata are then used for accessing to additional information allowing obtaining additional content to be synchronized and merged with the broadcast data at the at least one position indication in the content of the broadcast data.

These position indications which may be a time code, a block identifier, a relative time from start of a program or event are sent for example to the cloud or a content metadata database MD DB for retrieving corresponding additional information. The latter also submitted to the cloud provides additional content data and second metadata which is then merged to the content of the broadcast data at a given position indication. For example for a given movie at X minutes from the beginning, after a block identifier N or at a predefined sequence defined by a time code Tc, a short biography of the actor playing at this position (X, N, Tc) of the movie may be added on the display. The actor name is given by the movie metadata database accessible via the cloud in response to a request including a content identifier and the position indication and, the additional content (biography) is provided in response to a further information request to the cloud including the actor name. Metadata and/or extended metadata and/or additional information data are not only provided by the cloud but also by local databases or home networked storage area.

Another way of synchronizing data is to use information provided by an optional device B as illustrated by FIG. 2, which adds to the broadcast data contextual information relative to the environment or the user profile. This optional device B comprises environmental captors ENV CAP for light, humidity, noise, location, temperature etc. as well as contextual devices CD CAP captors connected to a home network Hnet. For example, location, information about content on a personal video recorder PVR, a personal computer PC, a storage area network SAN or other devices connected to the home network HNet can be used to select appropriate content or data by the multimedia device MM. In this way, data stored locally in a mass memory as for example in an optical or a hard disc may also be used together with data from the cloud to modify the broadcast data received by the multimedia device MM.

In a preferred configuration, the integrated receiver decoder IRD, the multimedia device MM and the television set TV may be driven by one single remote control RC as shown by FIG. 2 instead of one remote control (RC A, RC B, RC C) for each device as shown by FIG. 1. The single remote control RC is configured for sending commands to the multimedia device MM which forwards the commands to the integrated receiver decoder IRD. The multimedia device MM plays thus the role of synchronizing the remote controls of various other devices, in order to synchronize the usage of them. For example, the multimedia device MM can select an appropriate channel, pilot the PVR recording, and start a synchronization of the content and data synchronization using a single remote control RC.

The synchronization process can take into account the buffering available as time-shifting viewing on the integrated receiver decoder IRD. An identifier and location or position indication of the content currently transmitted by the integrated receiver decoder IRD to the television set TV is transmitted to the data extractor DEXT of the multimedia device MM to re-synchronize the data obtained by the data extractor DEXT with the precise content currently transmitted.

According to an embodiment the environmental captors ENV CAP for light, humidity, noise, location, temperature etc. are embedded in the remote control instead in the optional device B for adapting the content to the user environment and preferences.

The invention claimed is:

1. A method for sharing data and synchronizing broadcast data with additional information, the broadcast data and the additional information being provided by at least two distinct sources to a multimedia device, the method comprises steps of:
   receiving by a data extractor associated to the multimedia device broadcast data from a first source and extracting first metadata from the broadcast data,
   accessing by the multimedia device to first additional information provided by a second source by using the first metadata and obtaining from the first additional information second metadata and additional content data related to a content of the broadcast data, the second source comprising a cloud including a plurality of Internet resources and services,
   merging and synchronizing, by the multimedia device, the second metadata and the additional content data with the content of the broadcast data,
wherein the first metadata are completed by the data extractor with extended metadata comprising at least one position indication related to a given content of the broadcast data, said extended metadata being used for accessing to corresponding additional information allowing obtaining additional content to be synchronized and merged with the broadcast data at the at least one position indication in the content of the broadcast data, and wherein the at least one position indication comprises a time code, a block identifier, or a relative time from start of a program or event, and obtaining modified broadcast data.

2. The method according to claim 1, characterized in that the multimedia device comprises either an integrated receiver decoder, a television set, a display or a consumption device.

3. The method according to claim 2, characterized in that the data extractor is located between the integrated receiver decoder and the television set, the display or the consumption device.

4. The method according to claim 2, characterized in that the data extractor is associated to the integrated receiver decoder or to the television set, the display or the consumption device.

5. The method according to claim 1 wherein the first source providing broadcast data comprises a content aggregator at a managing center of an operator or broadcaster, said content aggregator multiplexing content from a plurality of sources together with meta-data stored in a database supplied by the second source.

6. The method according to claim 1 wherein the modified broadcast data is obtained by filtering the broadcast data according to criteria defined by the second metadata provided by the second source, the multimedia device parsing the first metadata of the broadcast data by using the second metadata provided by the second source.

7. The method according to claim 1 wherein an overlay is added to the broadcast content with the data extracted by the data extractor from the second source, said extracted data adding information about content currently broadcast are synchronized with corresponding parts of the content.

8. The method according to claim 7, wherein the data extractor receives additional data with an index indicating the added information during the broadcast of the content and sends to the multimedia device a command to display overlay information on the television set, said index being configured for bookmarking the overlay information for later use.

9. The method according to claim 1 wherein the metadata and the broadcast content are used to generate keywords for performing a search in the second source, said search providing results as additional information and content that the multimedia device merges with the broadcast content to obtain modified broadcast data.

10. The method according to claim 1 wherein the at least one position indication is sent to the cloud or a content metadata database for retrieving the corresponding additional information, said corresponding additional information submitted to the cloud providing additional content data and second metadata to be merged to the content of the broadcast data at a given position indication.

11. The method according to claim 1 further comprising a step of synchronizing and adding to the broadcast data contextual information relative to the environment or user profile by an additional device including environmental captors and contextual devices captors connected to a home network.

12. A multimedia device configured for sharing data and synchronizing broadcast data with additional information, the broadcast data and the additional information being provided to the multimedia device by at least two distinct sources, said multimedia device is characterized in that: it comprises:

a data extractor configured for receiving broadcast data from a first source and extracting first metadata from the broadcast data, an access module configured for accessing to first additional information provided by a second source by using the first metadata to obtain from the first additional information second metadata and additional content data related to a content of the broadcast data, the second source comprising a cloud including a plurality of Internet resources and services, a merging module configured for merging and synchronizing the second metadata and the additional content data with the content of the broadcast data to obtain modified broadcast data, wherein the data extractor is further configured to complete the first metadata by extended metadata comprising at least one position indication related to a given content of the broadcast data, said extended metadata being used by the access module to access to corresponding additional information allowing obtaining additional content to be synchronized and merged by the merging module with the broadcast data at the at least one position indication in the content of the broadcast data and wherein the at least one position indication comprises a time code, a block identifier, or a relative time from start of a program or event.

13. The multimedia device according to claim 12, comprising either an integrated receiver decoder, a television set, a display or a consumption device.

14. The multimedia device according to claim 12 wherein the data extractor is located between the integrated receiver decoder and the television set, the display or the consumption device, said data extractor being associated either to the integrated receiver decoder or to the television set, the display or the consumption device.

15. The multimedia device according to claim 12 comprising means for synchronizing and adding to the broadcast data contextual information relative to the environment or user profile, said data being provided by an additional device including environmental captors and contextual devices captors connected to a home network.

16. The multimedia device according to claim 12 wherein the access module is configured to send the at least one position indication to the cloud or a content metadata database, to retrieve the corresponding additional information, and to submit said corresponding additional information to the cloud, said cloud providing the merging module with additional content data and second metadata to be synchronized and merged to the content of the broadcast data at a given position indication.

* * * * *